US006119794A

United States Patent [19]

Chen

[11] Patent Number: 6,119,794

[45] Date of Patent: Sep. 19, 2000

[54] IMPACT WRENCH STRUCTURE

[76] Inventor: Kenneth Chen, 6F, No.969, Sec. 2, Jung Shan Rd., Tai Shan Shiang, Taipei County, Taiwan

[21] Appl. No.: 09/510,481

[22] Filed: Feb. 23, 2000

[51] Int. Cl.[7] .............................. B23Q 5/00; B25B 15/00

[52] U.S. Cl. ............................ 173/93; 173/93.5; 173/176

[58] Field of Search ..................................... 173/176, 178, 173/179, 93, 93.5, 93.6, 216; 81/54

[56] References Cited

U.S. PATENT DOCUMENTS

| | | | |
|---|---|---|---|
| 5,379,851 | 1/1995 | Huang | 173/179 |
| 5,435,398 | 7/1995 | Juan | 173/176 |
| 5,740,892 | 4/1998 | Huang | 173/93 |
| 5,887,666 | 3/1999 | Chen et al. | 173/93.5 |
| 5,915,484 | 6/1999 | Hsieh | 173/176 |
| 5,941,319 | 8/1999 | Juan | 173/93.5 |

*Primary Examiner*—Scott A. Smith
*Attorney, Agent, or Firm*—Pro-Techtor International Services

[57] ABSTRACT

Disclosed herein is an improved impact wrench structure comprising a reversible motor, a motor bracket, a hammer, driven wheel, a sealing adaptor, a transmission shaft, a clutch plate, two coil springs, and a set pin. The impact wrench according to the present invention has an improved largely simplified structure for facilitating manufacturing process and low cost, also is usable for replacing a flat tire on the way of driving by utilizing automobile power supply in stead of dragging the automobile to a repair shop for replacing the flat tire.

2 Claims, 5 Drawing Sheets

IMPACT WRENCH STRUCTURE

BACKGROUND OF THE INVENTION

1. Field of the Invention

The present invention relates to an improved impact wrench structure, and particularly, to an impact wrench carried in an automobile, in case there occurres a flat tire on the way, it can be operated to detach the punctured tire and replace it with a spare one by tightening/loosening various kinds of screw-like fixing parts using power supply from the automobile battery.

2. Description of the prior art

At present, most of the impact wrench for replacing a flat tire by tightening/loosening various kinds of screw-like fixing parts have almost resembling functions but with different internal structures. For example, "Innovated structure for impact wrench" disclosed by U.S. Pat. No. 322,853, Taiwan ROC. In this case, when replacing a flat tire, tightening/loosening screw-like fixing parts is performed by a centrifugal force transferred from a motor as a power source. However, due to a lot of parts are involved, it has to spend much more time to accomplish the assembly work with the result of increasing the manufacturing cost, moreover, some fixing parts having mutually different size or shape become an obstacle to applicability and increase fault rate of the wrench according to this invention.

Another cited case, "structure for impact wrench" disclosed in U.S. Pat. No. 326,735 Iaiwan ROC is an invention made to eleminate shortcomings of the former case described above. In the latter case, a clutch plate which is included in the former case is omitted and the figure and features of the hammer are changed and improved, but it is still unable to thoroughly eliminate the rest of shortcomings inherent to the former cited case.

In order to overcome the shortcomings inherent to the conventional techniques of the impact wrench including the cited cases described above, the present inventor has delved into this matter with a long time efforts and came to realization of the present invention.

SUMMARY OF THE INVENTION

Accordingly, it is an object of the present invention to provide impact wrench with a largely simplified structure so as to facilitate manufacturing process and minimizing cost.

It is another object of the present invention to provide impact wrench with an improved structure which is able to be used to replace a flat tire on the way of driving by utilizing automobile power supply in stead of dragging the automobile to a repair shop for replacing the flat tire.

To achieve above mentioned objects, the present invention provides an improved impact wrench structure comprising a reversible driving motor; driven wheel with an integrally formed hollow body having an open slot at the top end thereof; a driven gear; a hammer having a plannar top surface, an arc shaped bottom surface, and two knocking tips respectively formed at both bottom sides, each side having a concave slot thereon to accommodate a balancing weight; a clutch plate having a stopper at each side closely attaching on the hammer so as to restrict the moving range of the hammer; a pair of coil spring for keeping the clutch plate in position; and a transmission shaft for transmitting driving power whose output terminal is equipped with tools to drive the screw-like fixing parts for replacing a flat tire. With such a design, the reversible motor may get its power supply directly from the automobile. No matter whereat happens a flat tire, it can be replaced conveniently and promptly at the cite by means of an impact wrench with power supplied from the automobile.

THE BRIEF DESCRIPTION OF THE DRAWINGS

The accompanying drawings, which are included to provide a further understanding of the invention and incorporated in and constitute a part of this specification, illustrate an enbodiment of the invention and together with the description serves to explain the principle of the invention, wherein.

DETAILED DESCRIPTION OF THE PREFERRED EMBODIMENT

Figure 1:
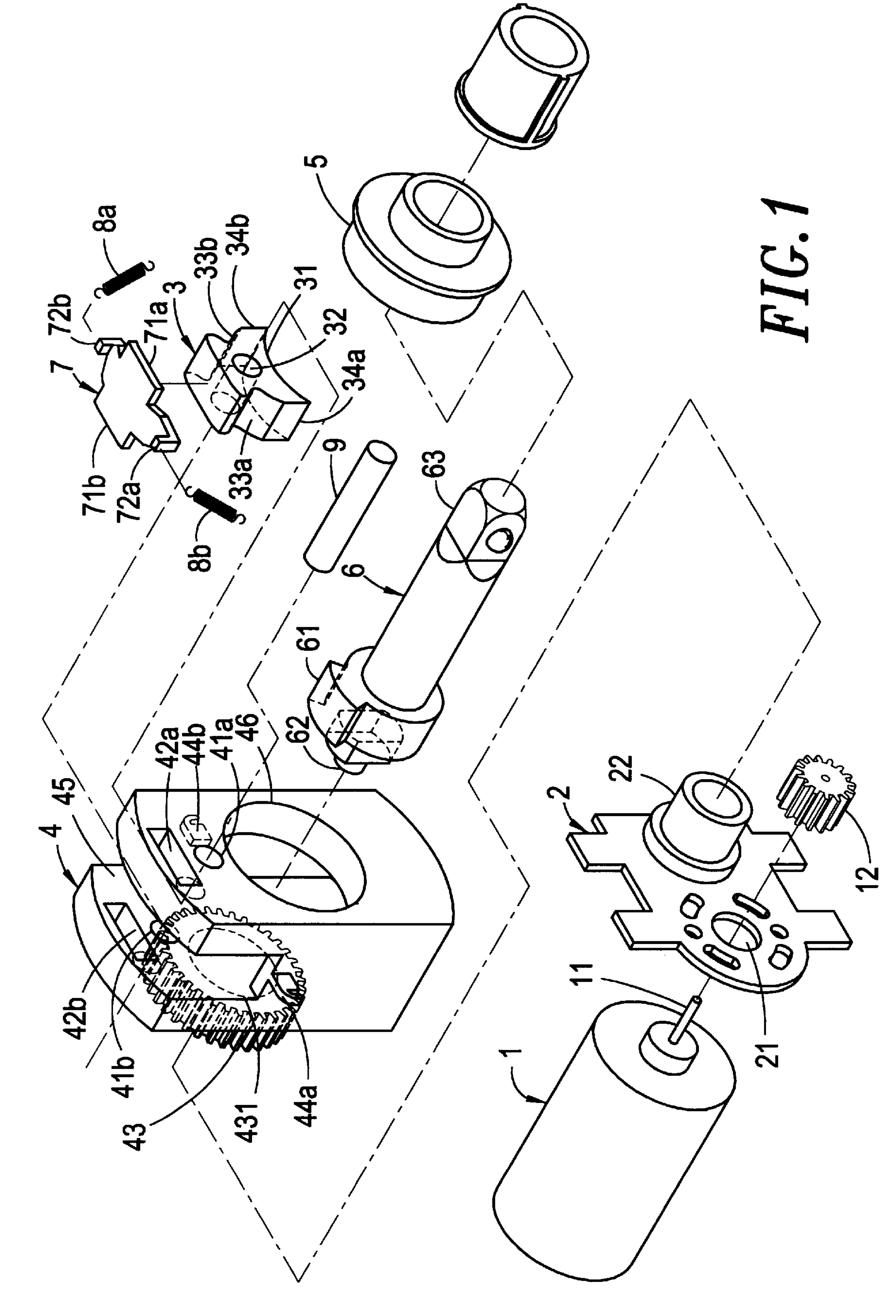
FIG. 1 is a three dimensional exploded view of the impact wrench structure according to the present invention.

Referring to FIG. 1, the impact wrench structure according to the present invention comprises a reversible motor 1, a motor bracket 2, a hammer 3, driven wheel 4, a sealing adaptor 5, a transmission shaft 6, a clutch plate 7, two coil springs 8*a*, and 8*b*, and a set pin 9. The driven wheel 4 is constituted of an integrally formed hollow body with an open slot 45 at its top thereof having two circular holes 41*a*, 41*b* and two rectangular holes 42*a*, 42*b* facing against each other in pair formed on respective side wall surfaces of the open slot 45. A pair of pegs 44*a* and 44*b* are extended rightwardly and leftwardly respectively from both bottom sides of the open slot 45. A driven gear 43 having a central hole 431 is installed on the rear end surface of driven wheel 4. A guide hole 46 is provided at the front end surface of driven wheel 4. A slim cylindrical axle 62 is provided at a terminal of the transmission shaft 6, while the other terminal of the shaft 6 is configured into square block 63 so as to be fitted to individual adaptor for driving various types and shapes of screw-like fixing parts for assembling/detaching an object. A reception block 61 for transmitting load is provided at an appropriate position on the transmission shaft 6. The top of the hammer 3 is formed into a plannar surface, while the bottom thereof is formed into an arc shaped surface 31 thereby the two bottom ends of the hammer are respectively formed into knocking tips 34*a*, 34*b*. Furthermore, two concave slots 33*a*, 33*b* on the two top ends are formed thereon respectively for accommodation of balancing weights. A through hole 32 is bored through the center of the hammer 3. A pair of stoppers 71*a*, 71*b* are stretched out of the front and the rear sides of the clutch plate 7 so that the effective moving range of the clutch plate 7 is restricted within the rectangular holes 42*a*, 42*b* of the open slot 45. On the other hand, there are a pair of hooks 72*a*, 72*b* formed respectively at both upper sides of the clutch plate 7. The reversible motor 1 is settled on the motor bracket 2 through central hole 21. A transmission gear 12 is combined to a motor shaft 11 of the reversible motor 1. A hollow axle 22 is extended from the motor bracket 2 for connecting to driven wheel 4.

Figure 2:
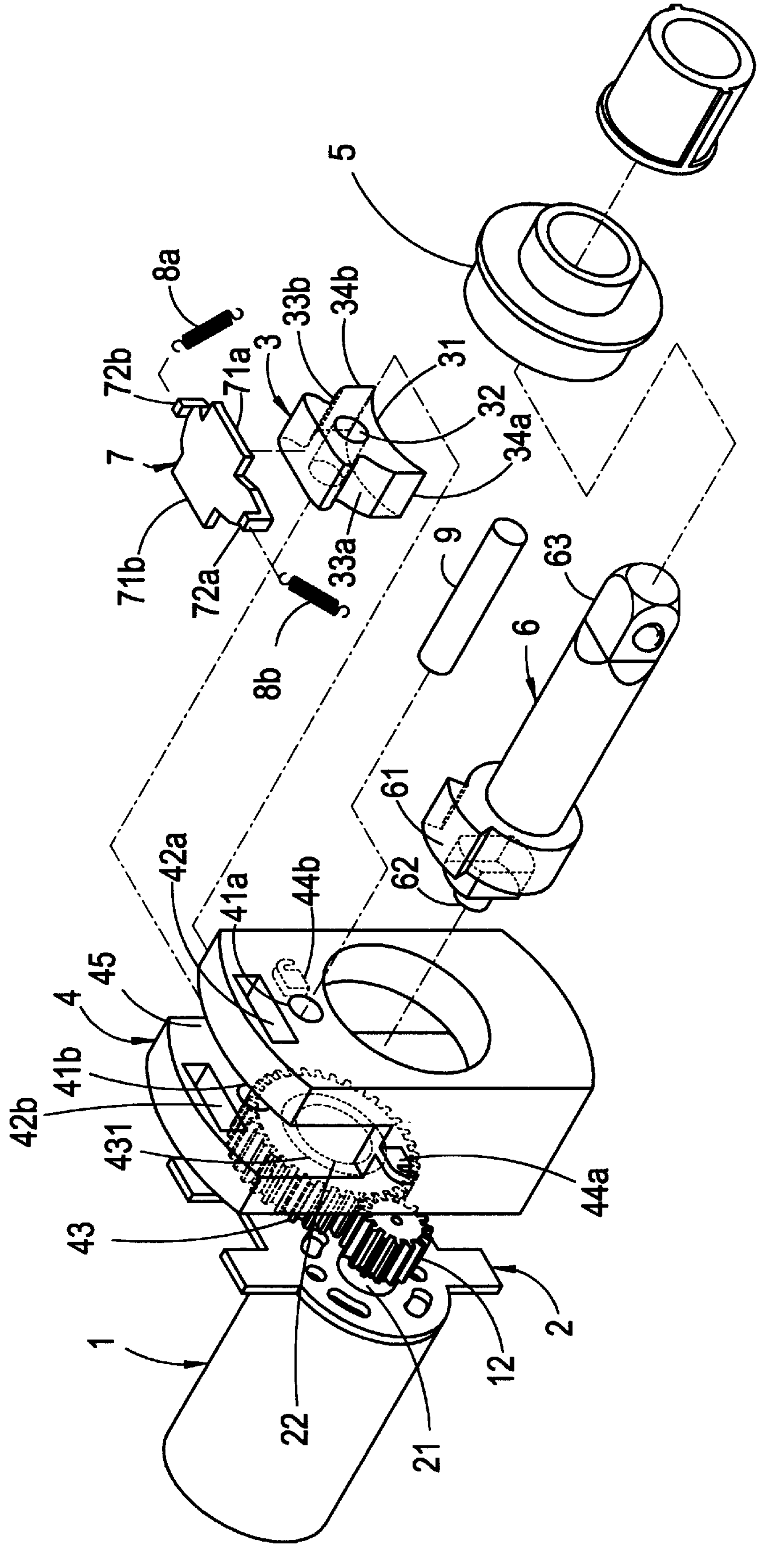
FIG. 2 is a schematic view of the impact wrench structure of the present invention showing that driving power source is engaged with the wrench.
Figure 3:
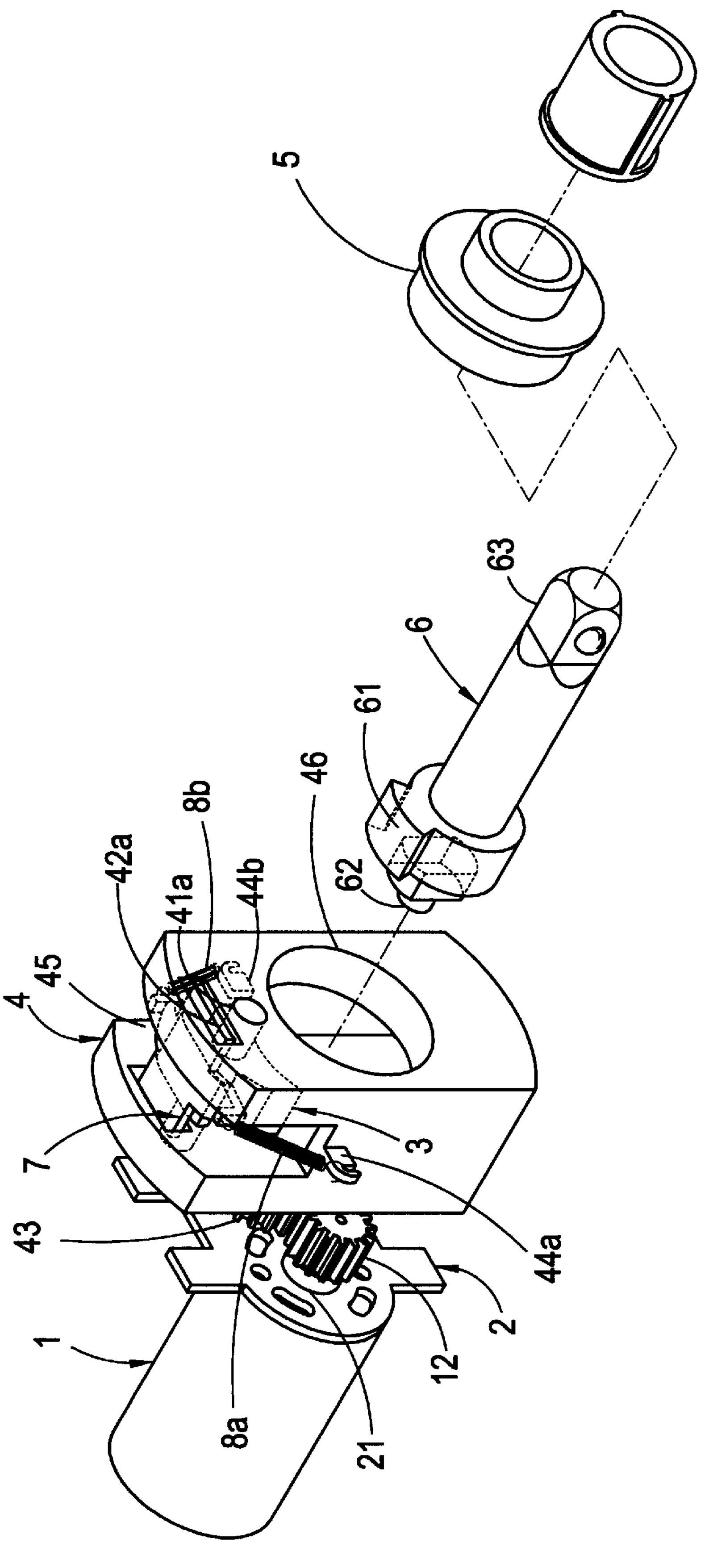
FIG. 3 is a schematic view of the impact wrench structure of the present invention showing that the hammer is engaged with driven wheel.

Referring to FIG. 2, in this drawing, it is observed that driving power source is in engagement with the wrench. At this time the hollow axle 22 on the motor bracket 2 is inserted into the central hole 431 of the driven wheel 43 so that the driven gear 43 may be conjoined with the transmission gear 12 installed in front of the reversible motor thereby the transmission gear 12 is able to drive driven wheel 4 to rotate with a high speed with respect to the hollow axle 22 as a rotation center. Referring to FIG. 3, it shows that the hammer 3 is in engagement with driven wheel. As shown in the drawing, the hammer 3 is placed in the open slot 45 of driven wheel 4 so that the through hole 32 of the hammer 3 is aligned to the circular hole 41*a*, 41*b* formed at the side wall surfaces of driven wheel 4, and further, by means of insertion of the set pin 9, the hammer 3 is thus captured in the open slot 45 with its arc shaped surface 31 at the bottom thereof parallel to the arc shaped surface of the reception black 61 of the transmission shaft 6. At this moment the stoppers 71*a*, 71*b* of the clutch plate 7 are accommodated in respective rectangular hole 42*a*, 42*b* of the open slot 45 so as to closely cover on the top surface of the hammer 3. In the meanwhile, the coil springs 8*a* and 8*b* are hooking their one end respectively to hooks 72*a* and 72*b* respectively provided at right and left sides of the clutch plate 7, while hooking the other end respectively to pegs 44*a* and 44*b* formed at both sides of driven wheel 4 such that the clutch plate 7 is detained in the open slot 45 of driven wheel 4 by elastic force provided by the springs 8*a* and 8*b*.

Figure 4:
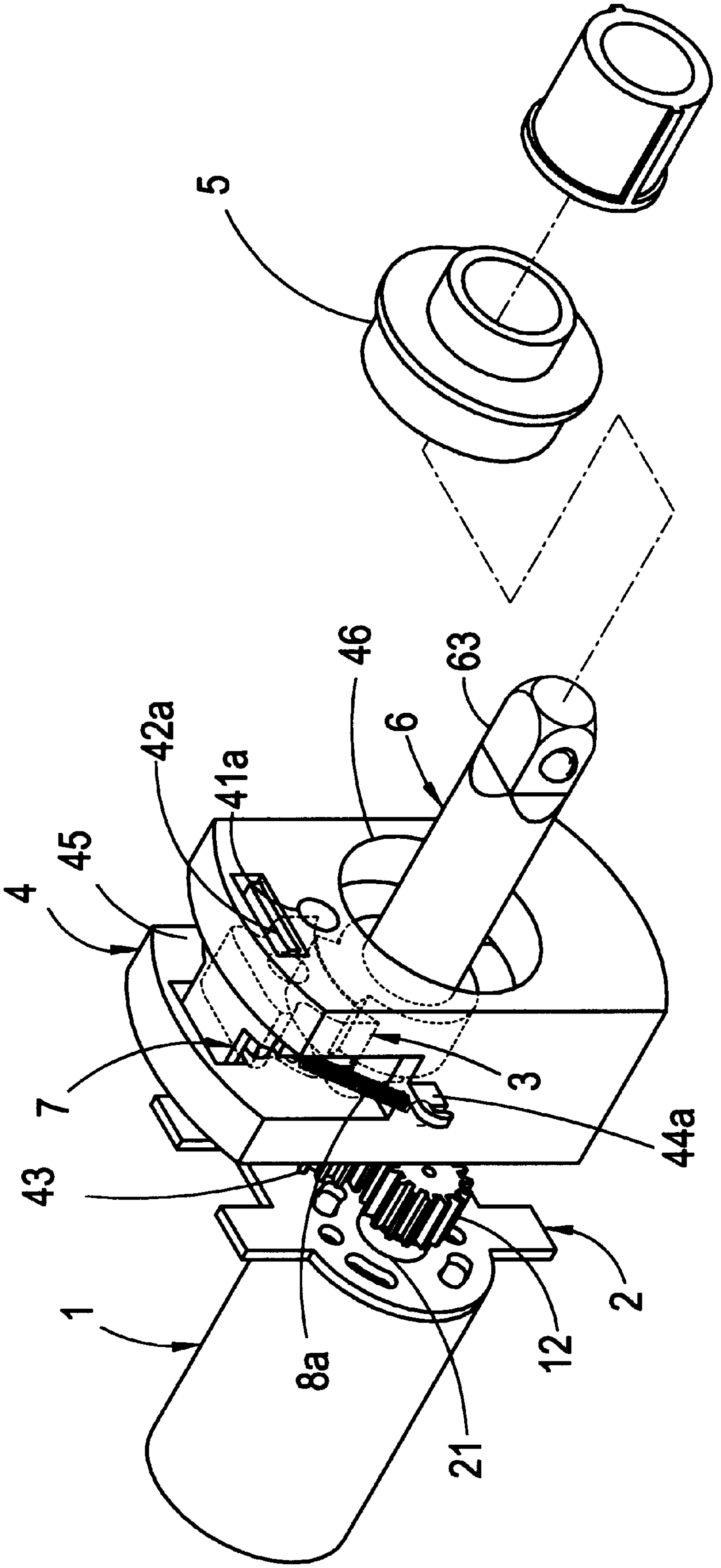
FIG. 4 is a schematic view of the impact wrench structure of the present invention showing that the transmission shaft and driven wheel are engaged together.
Figure 5:
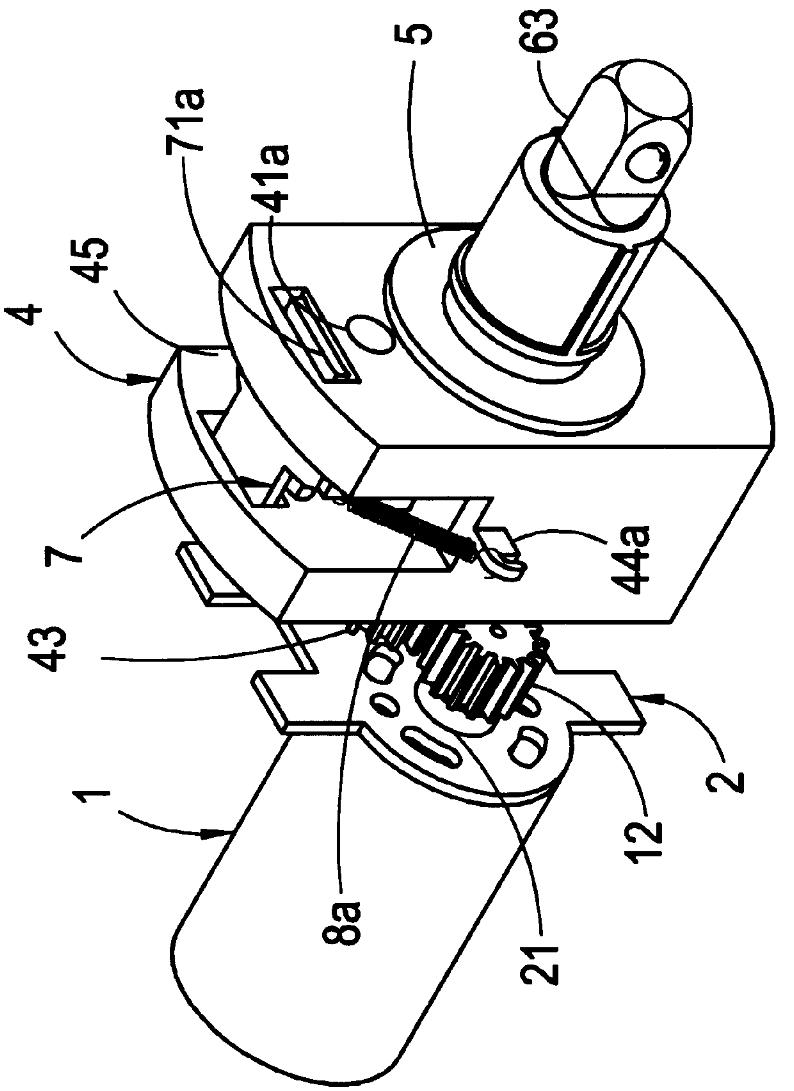
FIG. 5 is a completely assembled perspective drawing of the impact wrench structure according to the present invention.

Referring to FIGS. 4 and 5, these are drawings showing that the transmission shaft and driven wheel being engaged together (FIG. 4) and the completely assembled unit (FIG. 5) respectively. As shown in the drawings, the circular axle 62 at one end of the transmission shaft 6 is hinged to the hollow axle 22 on the motor bracket 2 through the guide hole 46 provided at the front end of the driven wheel 4 so as to settle the reception block 61 of the transmission shaft 6 in the driven wheel 4, and to face against the arc shaped surface 31 formed at the bottom of the hammer 3. Finally, a sealing adaptor 5 is covered around the transmission shaft 6 and further sealing the guide hole 46 of driven wheel 4 thereby completing an assembled unit of the impact wrench structure according to the present invention (FIG. 5).

As the motor 1 is energized, the rotating torque is transmitted through the motor 1 ->transmission gear 12 ->driven gear 43 with the result that driven wheel 4 is rotated with high speed. At this time, being actuated by a centrifugal force, the clutch plate 7 overcomes resilient force of two spring 8*a*, 8*b* and excurses outwardly thereby releasing the hammer 3 free to move. As a result, being actuated by the balancing weights provided, the knocking tips 34*a* and 34*b* follow driven wheel 4 to rotate and knock downwardly with respect to the pin 9 to be traped in the reception block 61 of the transmission shaft 6 so that the transmission shaft 6 synchronously rotates together with driven wheel 4 and lets the adaptor equipped at the transmission shaft terminal drive the screw-like fixing parts for replacing a flat tire or performing other works. As the output power is cut off, driven wheel ceases rotation. As a result, the centrifugal force disappears so that the clutch plate 7 returns to its initial position by restoring force of springs 8*a* and 8*b*. The knocking tip 34*a* and 34*b* are released from the reception block 61 of the transmission shaft 6 due to a pulling force exerted by the clutch plate 7 returning to its initial position, and finally the knocking tips 34*a*, 34*b* also restore their initial positions. Then the wrech stops working. The above described state will be recycled according to actual requirement of work to be performed.

As being set in driven wheel 4, the hammer 3 is able to knock differently on the reception block 61 according to rotating direction of the motor I so that the wrench may tighten or loosen a screw-like object.

An impact wrench of the present invention is of largely simplified structure for facilitating manufacturing process and minimized cost, also is usable to replace a flat tire on the way of driving by utilizing automobile power supply in stead of dragging the automobile to a repair shop for replacing the flat tire as described in the above embodiment.

Many changes and modifications in the above described embodiment of the invention can, of course, be carried out without departing from the scope thereof. Accordingly, to promote the progresss in science and the useful arts, the invention is disclosed and is intended to be limited only by the appended claims.

What is claimed is:

1. Impact Wrench Structure:

a driven wheel being constituted of an integrally formed hollow body with an open slot at its top thereof having two circular holes and two rectangular holes facing against each other in pair formed at respecitive side wall surfaces of said open slot, a pair of pegs being extended rightwardly and leftwardly respectively from both bottom sides of said open slot, a driven gear having a central hole being installed on the rear end surface, and a guide hole being provided at the front end surface;

a hammer being positioned in said open slot of said driven wheel by a pin, having a plannar top surface and an arc shaped bottom surface while two bottom ends being formed into two knocking tips, with two corresponding concave slots formed at appropriate positions thereon for accommodation of two balancing weights, a through hole being bored through the center such that when said hammer is captured in said open slot of driven wheel, said through hole is aligned to said two circular holes formed at the side wall surfaces of said open slot;

a clutch plate having a pair of stoppers being stretched out of the front and rear sides to be respectively detained in said pair of rectangular holes of said open slots so as to cover on the top surface of said hammer thereby moving range of the same to be limited within said rectangular holes, and a pair of hooks being formed respectively at right and left sides thereof;

a pair of coil springs being installed at both sides of said open slot of said driven wheel hooking their one end respectively to said hooks formed at both sides of said clutch plate, while hooking the other end respectively to said pegs formed at both sides of said driven wheel;

a motor bracket having a central hole and a hollow axle being extended thereof for connecting to said driven wheel;

a reversible motor being settled on said motor bracket and combined to a transmission gear with a motor shaft;

a transmission shaft being provided with one terminal formed into a cylindrical axle and the other terminal configured into a square block so as to be fitted to individual adaptor for driving screw-like fixing parts for assembling/detaching an object, and a reception block for transmitting load being provided at an appropriate position thereon;

wherein the hollow axle fixed to said motor bracket is installed in said central hole of said driven gear such that said transmission gear connected to said reversible motor can be conjoined with said driven gear to transmit power, and said circular axle at one end of said transmission shaft is hinged to said hollow axle on said motor bracket through said guide hole provided at the front end of said driven wheel so as to settle said reception black of said transmission shaft in said driven wheel, and to face against the arc shaped surface formed at the bottom of said hammer, then a scaling adaptor is covered around said transmission shaft and further said guide hole of said driven wheel is sealed thereby completing an assembled unit of an impact wrench.

2. Impact wrench structure as claimed in claim 1, wherein, said driven wheel is an integrally formed hollow body.

* * * * *